(12) United States Patent
Solomon et al.

(10) Patent No.: US 12,390,885 B2
(45) Date of Patent: Aug. 19, 2025

(54) LASER MARKING SYSTEM FOR VEHICLE BODY CUSTOMIZATION

(71) Applicant: GM Global Technology Operations LLC, Detroit, MI (US)

(72) Inventors: Joshua Lee Solomon, Berkley, MI (US); Hui-Ping Wang, Troy, MI (US); Antonio R. Vittorini, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 960 days.

(21) Appl. No.: 17/518,106

(22) Filed: Nov. 3, 2021

(65) Prior Publication Data
US 2023/0136173 A1    May 4, 2023

(51) Int. Cl.
*B23K 26/359* (2014.01)
*B23K 26/362* (2014.01)
*B23K 26/40* (2014.01)
*B23K 103/16* (2006.01)

(52) U.S. Cl.
CPC .......... *B23K 26/359* (2015.10); *B23K 26/362* (2013.01); *B23K 26/40* (2013.01); *B23K 2103/172* (2018.08)

(58) Field of Classification Search
CPC ................ B23K 26/082; B23K 26/362; B23K 2103/42; B23K 26/0006; B23K 26/032; B23K 26/123; B23K 26/355; B23K 26/38; B23K 26/364; B23K 26/382; B23K 26/40; B23K 26/702; B23K 2103/52; B23K 2103/50; B23K 2103/00; B23K 2103/34; B23K 26/03; B23K 26/043; B23K 26/06; B23K 26/04; B23K 26/0622; B23K 26/064; B23K 26/0643; B23K 26/0665; B23K 26/073; B23K 26/0648; B23K 26/704; B23K 26/703; B23K 26/402; B23K 26/36; B23K 26/361; B23K 26/359; B23K 26/354; B23K 26/342; B23K 26/24; B23K 26/16; B23K 26/127; B23K 26/142; B23K 26/144; B23K 26/1224; B23K 26/0884; B23K 26/0846; B23K 26/083
USPC .......................... 219/121.69, 121.84, 121.85
See application file for complete search history.

(56) References Cited

U.S. PATENT DOCUMENTS

2010/0174407 A1* 7/2010 Fukawa ............. B23K 26/0884 901/14
2021/0107400 A1* 4/2021 Erler ...................... H03K 17/96

* cited by examiner

*Primary Examiner* — Chris Q Liu
(74) *Attorney, Agent, or Firm* — CANTOR COLBURN LLP

(57) ABSTRACT

A method of customizing a vehicle body includes inputting a selected customized embellishment to a laser controller, directing a beam of the laser onto a surface of the vehicle body, and guiding the beam of the laser with the laser controller to impart the selected customized embellishment to the surface.

19 Claims, 3 Drawing Sheets

LASER MARKING SYSTEM FOR VEHICLE BODY CUSTOMIZATION

INTRODUCTION

The subject disclosure relates to the art of vehicles and, more particularly, to a laser marking system for customizing a vehicle body.

When purchasing a new vehicle, consumers are faced with a wide range of available options. One such option is choosing an exterior color for the vehicle. Other options may include trim packages which include decals that are attached to exterior surfaces of the vehicle. Often times, a consumer will purchase a vehicle having a particular exterior color with an intention to add further embellishment.

Additional embellishments may include colorful wraps that impart design elements to the exterior color, add personalized symbols, and/or otherwise allow the consumer to personalize the vehicle. In other cases, the consumer will add painted features to the exterior color in an effort to personalize the vehicle. In either instance, the additional embellishments are applied over a clear coat and often times do not adhere as desired. Further, incorporating the additional embellishments into the vehicle is time consuming and costly. Often times, when adding design elements, the consumer will lose access to the vehicle for a week or more. An ability to personalize the vehicle at a point of purchase would reduce costs, allow the embellishments to be better integrated into the vehicle finish, and eliminate loss of access to the vehicle as the embellishments will be completed at the time of delivery.

SUMMARY

Disclosed, in accordance with a non-limiting example, is a method of customizing a vehicle body including inputting a selected customized embellishment to a laser controller, directing a beam of the laser onto a surface of the vehicle body, and guiding the beam of the laser with the laser controller to impart the selected customized embellishment to the surface.

In addition to one or more of the features described herein directing the beam of the laser onto the surface of the vehicle body includes directing the beam of the laser onto an unpainted surface to create the selected customized embellishment.

In addition to one or more of the features described herein forming a pattern replicating tool marks on the unpainted surface with the laser.

In addition to one or more of the features described herein controlling one of an intensity of the beam of the laser and incident angles of the beam of the laser to generate a color change in the unpainted surface.

In addition to one or more of the features described herein removing portions of at least one layer of paint from a painted surface of the vehicle body with the beam of the laser and revealing a second layer of paint below the at least one layer.

In addition to one or more of the features described herein removing the portions of the at least one layer with the beam of the laser includes removing a portion of a first layer having a first color and removing a portion of a second layer having a second color.

In addition to one or more of the features described herein removing the portion of the second layer with the beam of the laser reveals a third color.

In addition to one or more of the features described herein removing another portion of the first layer with the beam of the laser to expose the second color.

In addition to one or more of the features described herein removing the portion of the first layer with the beam of the laser includes controlling the beam of the laser to penetrate the painted surface a first depth.

In addition to one or more of the features described herein removing the portion of the second layer with the beam of the laser includes controlling the beam of the laser to penetrate the painted surface a second depth.

In addition to one or more of the features described herein controlling the beam of the laser to penetrate the painted surface a second depth includes penetrating the second layer a depth that is distinct from the first depth.

In addition to one or more of the features described herein a vehicle includes the vehicle body formed by the method described herein.

Also disclosed, in accordance with a non-limiting example, a method of customizing a painted surface having at least two layers of paint each having a different color includes inputting a selected customized embellishment to a laser controller, removing a portion of a first layer of the at least two layers with a beam of a laser to reveal a portion of a second layer of the at least two layers to impart the selected customized embellishment on the painted surface.

In addition to one or more of the features described herein removing another portion of the first layer with the beam of the laser to expose another portion of the second layer.

In addition to one or more of the features described herein removing a portion of a third layer of the at least two layers with the beam of the laser to reveal a portion of a fourth layer of the at least two layers.

In addition to one or more of the features described herein removing the portion of the first layer includes controlling the beam of the laser to penetrate the painted surface a first depth.

In addition to one or more of the features described herein removing the portion of the second layer with the beam of the laser includes controlling the beam of the laser to penetrate the painted surface a second depth.

In addition to one or more of the features described herein controlling the beam of the laser to penetrate the painted surface a second depth includes penetrating the second layer a depth that is distinct from the first depth.

In addition to one or more of the features described herein controlling the beam of the laser to impart multiple embellishments in the painted surface.

In addition to one or more of the features described herein a vehicle having a painted surface is formed by the method described herein.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
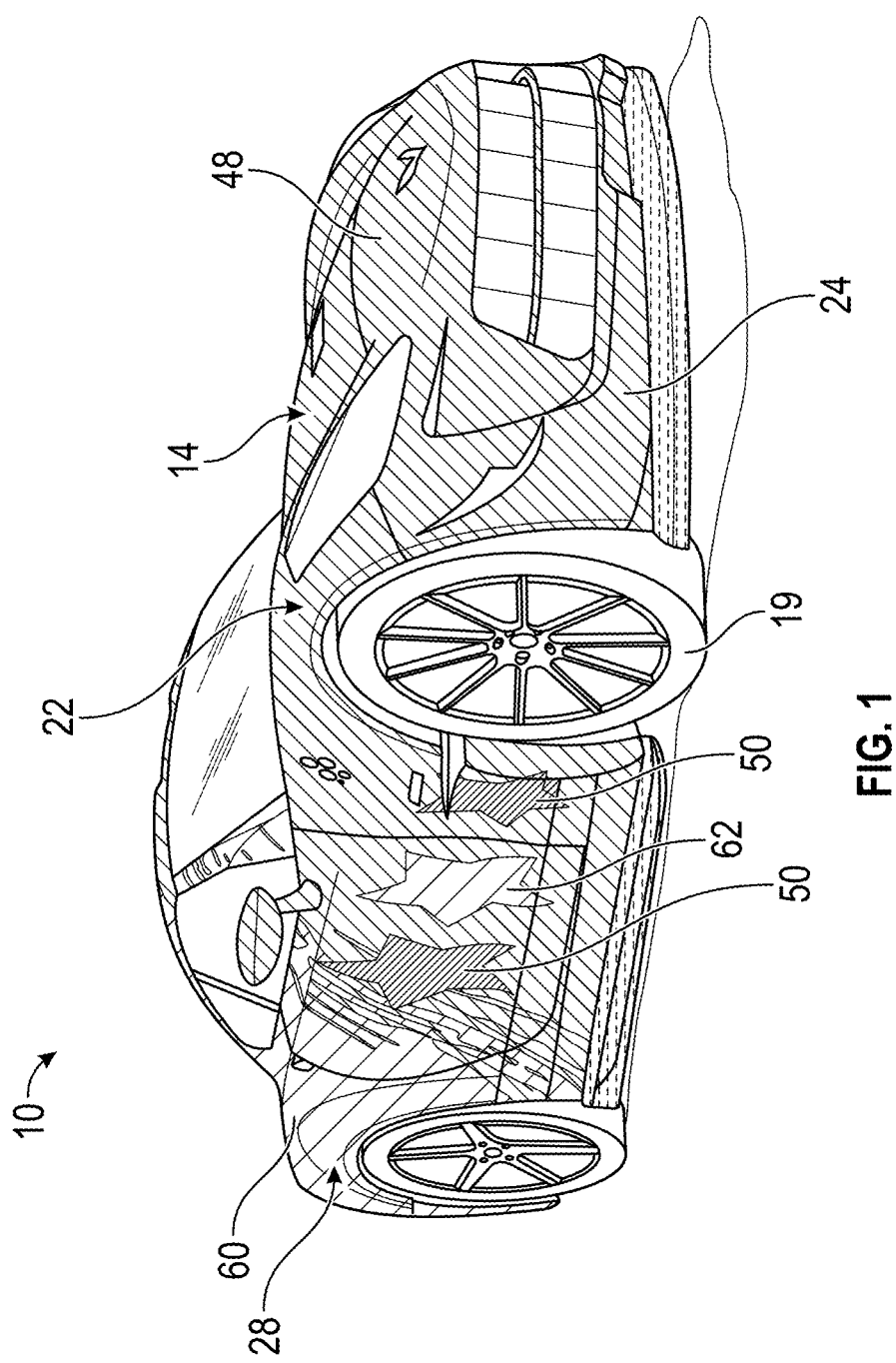
FIG. 1 depicts a vehicle including a body having a customized surface formed in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 14 supported on a frame (not shown) and a plurality of wheels, one of which is indicated at 19. Body 12 includes a surface 22 that has applied thereto a number of painted layers 24. In a non-limiting example, a customized embellishment 28 is created on surface 22. In a non-limiting example, customized embellishment 28 is created by removing portions of one or more of painted layers 24 applied to surface 22.

Figure 2:
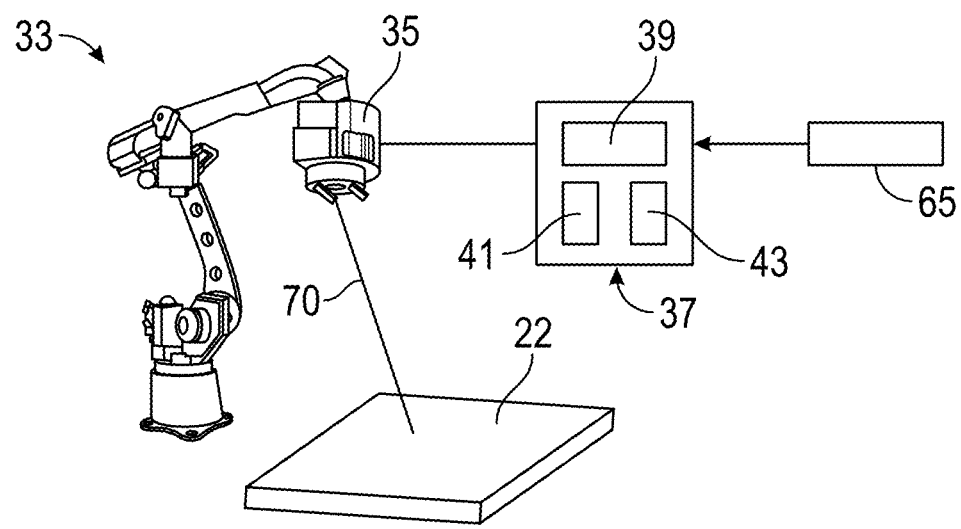
FIG. 2 depicts a laser system for creating a customized surface in accordance with a non-limiting example.

Referring to FIG. 2, a laser system 33 is shown to include a laser 35 connected to a laser controller 37. Laser controller 37 directs a beam 70 from laser 35 to create customized embellishment 28 on surface 22. In a non-limiting example, laser controller 37 includes a central processing unit (CPU) 39 operatively and functionally connected to a non-volatile memory 41, and a laser control module 43. In a non-limiting example, laser control module 43 controls the power of beam 70 emitted from laser 35 to have desired penetration depth as well as guiding laser system 33 in terms of an moving path of emitted beam 70, defocus distance and incident angles to surface 22 to remove select portions of painted layers 24 to create customized embellishment 28.

Figure 3:
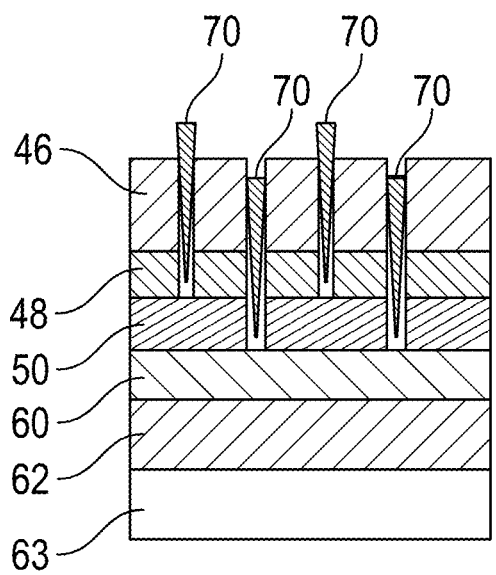
FIG. 3 depicts a multi-layered painted surface being customized by the laser system of FIG. 2, in accordance with a non-limiting example.

Referring to FIG. 3, in a non-limiting example, painted layers 24 includes a first layer 46 having a first thickness, a second layer 48 having a second thickness, a third layer 50 having a third thickness, a fourth layer 60 having a fourth thickness, and a fifth layer 62 having a fifth thickness that is applied to an unpainted surface 63 of body 12. Fifth layer 62 may take the form of a paint primer and first layer 46 may take the form of a clear coat. Second layer 48, third layer 50, and fourth layer 60 may take the form of various layers of different colored paint. It should be understood that the number, type, and color of each layer may vary. It should also be understood that each of the first thickness, second thickness, third thickness, fourth thickness, and fifth thickness may be similar or different depending upon paint type, paint color, coverage, and the like.

In a non-limiting example, laser controller 37 may control laser 35 based on instructions stored in laser control module 43 and a pattern that may be stored on non-volatile memory 41. Beam 70 from laser 35 may be guided to remove one or more portions of the first layer 46, second layer 48, third layer 50, and a fourth layer 60 in order to create a selected design that forms customized embellishment 28. The design may be selected prior to production and created toward an end of a production process, or after purchase. The design may be chosen from a number of available designs or could be unique to, and supplied by, a consumer via an input 65 fed into laser controller 37.

Figure 4:
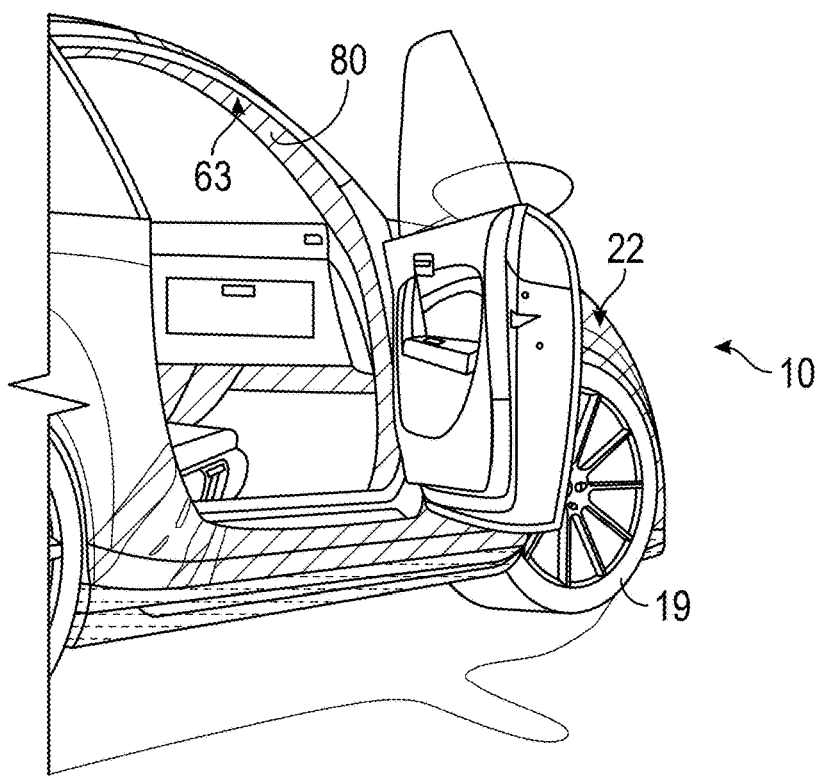
FIG. 4 depicts the vehicle body of FIG. 1 with an open door showing an inner surface having an embellishment created, in accordance with a non-limiting example.
Figure 5:
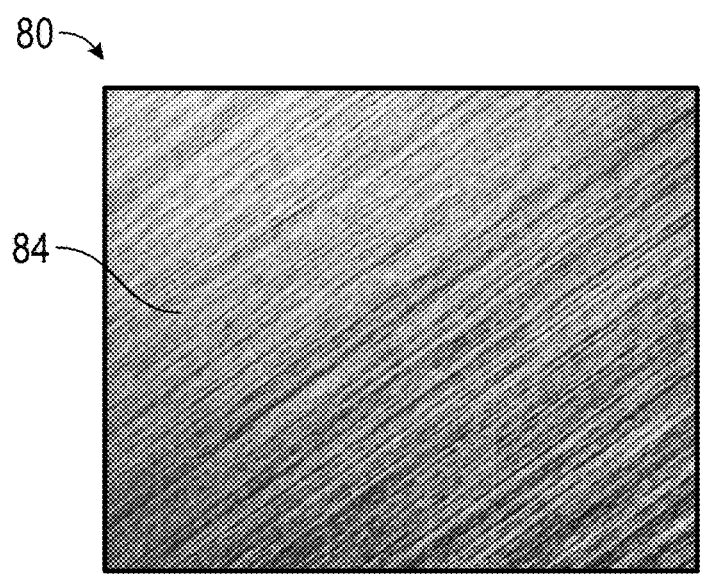
FIG. 5 is a detailed view of the embellishment of FIG. 4, in accordance with a non-limiting example.

In another non-limiting example depicted in FIGS. 4 and 5, a customized embellishment 80 may be applied to unpainted surface 63 in selected areas of vehicle 10. In a non-limiting example, customized embellishment 80 may take the form of simulated tool marks 84 as shown in FIG. 5, such as would be made by an angle grinder. It should be understood that various other designs, simulated tool marks, and the like may be integrated into one or more surfaces of vehicle 10 through operation of laser system 33. Embellishments may be added during and/or after production. Embellishments may be factory added or created at a dealership.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of customizing a vehicle body comprising:
   inputting a selected customized embellishment to a laser controller;
   directing a beam of a laser onto a surface of the vehicle body; and
   guiding the beam of the laser with the laser controller to impart the selected customized embellishment to the surface,
   wherein the surface of the vehicle body includes a painted surface comprising a first layer of paint having a first color, a second layer of paint having a second color, and a third layer having a third color,
   wherein the first, second, and third colors are different from each other,
   wherein the first layer of paint is on the second layer of paint and the second layer of paint is on the third layer of paint,
   wherein the guiding the beam of the laser with the laser controller comprises:
     moving the beam of the laser along the surface of the vehicle body,
     controlling a penetration depth of the beam of the laser at a first portion of the surface of the vehicle body to penetrate the first layer of paint and remove the first layer of paint to expose the second layer of paint having the second color, and
     controlling the penetration depth of the beam of the laser at a second portion of the surface of the vehicle body to penetrate the first and second layers of paint and remove the first and second layers of paint to expose the third layer of paint having the third color.

2. The method of claim 1, wherein the vehicle further comprises an unpainted surface, and the method further comprises directing the beam of the laser onto an unpainted surface to create the selected customized embellishment.

3. The method of claim 2, further comprising forming a pattern replicating tool marks on the unpainted surface with the beam of the laser.

4. The method of claim 3, wherein the pattern replicating the tool marks comprises a pattern that would be made by an angle grinder.

5. The method of claim 2, further comprising controlling one of an intensity of the beam of the laser and incident angles of the beam of the laser to generate a color change in the unpainted surface.

6. The method of claim 1, wherein the beam of the laser is controlled at the first portion to penetrate the painted surface a first depth that is equal to or greater than a thickness of the first layer of paint.

7. The method of claim 6, wherein the beam of the laser is controlled at the second portion to penetrate the painted surface a second depth that is equal to or greater than the combined thickness of the first and second layers of paint.

8. The method of claim 1, wherein the painted surface further comprises a fourth layer of paint disposed on the first layer of paint.

9. The method of claim 8, wherein the fourth layer of paint is a clear coat.

10. The method of claim 9, wherein the beam of the laser is controlled at the first portion to penetrate the painted surface a depth that is equal to or greater than a combined thickness of the fourth and first layers of paint.

11. The method of claim 9, wherein the beam of the laser is controlled at the second portion to penetrate the painted surface a depth that is equal to or greater than a combined thickness of the fourth, first, and second layers of paint.

12. The method of claim 1, wherein the painted surface further comprises a fourth layer of paint, the third layer of paint being disposed on the fourth layer of paint.

13. The method of claim 12, wherein the fourth layer is a paint primer.

14. The method of claim 1, wherein the laser controller comprises a central processing unit, a non-volatile memory, and a laser control module.

15. The method of claim 14, wherein the beam of the laser is controlled via the laser control module.

16. The method of claim 14, wherein a pattern of the selected customized embellishment is stored on the non-volatile memory.

17. The method of claim 1, further comprising receiving an input from a consumer indicating the selected customized embellishment.

18. The method of claim 17, further comprising providing different designs of customized embellishments to the customer and receiving one of the designs selected by the consumer as the selected customized embellishment.

19. The method of claim 17, wherein the receiving the input from the customer comprises receiving a design provided by the consumer as the selected customized embellishment.

* * * * *